US005797005A

United States Patent [19]
Bahls et al.

[11] Patent Number: 5,797,005
[45] Date of Patent: Aug. 18, 1998

[54] SHARED QUEUE STRUCTURE FOR DATA INTEGRITY

[75] Inventors: James W. Bahls, Pleasanton; George S. Denny, San Jose; Richard G. Hannan, San Jose; Janna L. Mansker, San Jose; Bruce E. Naylor, Morgan Hill, all of Calif.; Karen D. Paffendorf, East Brunswick, N.J.; Betty J. Patterson, San Jose, Calif.; Sandra L. Stoob, Morgan Hill, Calif.; Judy Y. Tse, San Francisco, Calif.; Anu V. Vakkalagadda, San Jose, Calif.

[73] Assignee: International Business Machines Corporation, Armonk, N.Y.

[21] Appl. No.: 366,554

[22] Filed: Dec. 30, 1994

[51] Int. Cl.$^6$ .................. G06F 15/163; G06F 9/00
[52] U.S. Cl. ........................... 395/680; 395/683
[58] Field of Search .................. 395/650, 700, 395/671, 670, 672, 704, 680; 707/104, 204

[56] References Cited

U.S. PATENT DOCUMENTS

| | | | |
|---|---|---|---|
| 4,507,760 | 3/1985 | Fraser | 365/221 |
| 5,222,217 | 6/1993 | Blount et al. | 707/204 |
| 5,224,215 | 6/1993 | Disbrow | 395/200.64 |
| 5,317,739 | 5/1994 | Elko et al. | 395/200.46 |
| 5,319,778 | 6/1994 | Catino | 707/102 |
| 5,355,484 | 10/1994 | Record et al. | 395/704 |
| 5,428,781 | 6/1995 | Duault et al. | 395/672 |

OTHER PUBLICATIONS

Iyer. B., "Shared Memory–Based Protocol for Transaction Recovery In Distributed DB/DC Systems." IBM Disclosure No. TDB 05–87. pp. 5493–5495. Abstract only.
"Advanced Unix Programing" by March J. Rochkind Prencetice–Hall Inc. 1985. pp: 156–164.
"An Introduction to Operating Systems" by Harvey M. Deitel Addison–Wesley Publishing Company 1990. pp. 453, 455–460, 469, 601–603, 689, 690, 801–803, & 809.
"Inside Paradox for Windows" by New Riders Publishing 1993. by Richard Wagner. pp. 44–46, 170–171.

Primary Examiner—Majid A. Banankhan
Attorney, Agent, or Firm—David Kappos; Sterne, Kessler, Goldstein & Fox, PLLC

[57] ABSTRACT

A shared queue is provided to allow any of a plurality of systems to process messages received by clients of a data processing environment. A received message is enqueued onto the shared queue. Any of the plurality of systems having available processing capacity can retrieve the message from the shared queue and process the message. A response to the message, where appropriate, is enqueued onto the shared queue for delivery back to the client. A unique list structure is provided to implement the queue. The list structure is comprised of a plurality of sublists, or queue types. Each queue type is divided into a plurality of list headers. List entries, containing data from the received messages, are chained off of the list headers. A common queue server is used to interface to the queue and to store messages thereon. The common queue server stores message data in storage buffers, and then transfers this data to the list entries. Thus, common queue server coordinates the enqueuing of data onto the shared queue.

24 Claims, 7 Drawing Sheets

SHARED QUEUE STRUCTURE FOR DATA INTEGRITY

TECHNICAL FIELD

The present invention relates generally to parallel processing environments, and more specifically to a shared queue for a multi-processor environment.

BACKGROUND ART

It is commonplace in contemporary data processing environments to provide a plurality of systems to handle the processing needs of one or more clients. For example, two or more systems, such as transaction processing systems, may be interfaced to one or more clients via a communications network. In this environment, when a client has a task to be performed by one of the systems, that client sends an input message to the desired system to request processing by an application running in that system. The subject system queues the message and provides the message to the application for processing. When processing is complete, the application places an outgoing message in the queue for transmission over the network to the client.

To take advantage of the multi-processing aspect of this environment, the system originally tasked by the client, system A, may extract the input message from its queue, forward the input message to a second system, system B, for processing. When processing is completed by system B, the response (outgoing message) is forwarded to system A and placed on system A's queue for transmission to the client. Thus, in this manner, multiple systems can be utilized to handle processing requests from numerous clients.

There are, however, a few disadvantages with this arrangement. First, if system A fails, none of the work on the queue of system A can be accessed. Therefore, the client is forced to wait until system A is brought back online to have its transaction processed.

A second disadvantage is that the client can only access the results of its original request from the system that it requested do the processing. The reason for this is that the transaction in question was provided to system A and queued in system A's queue. The client sent the message to system A and only looks for the response from system A. If the transaction was sent to system B for processing, both system B and system A must be available in order for the client to receive a response.

A third disadvantage is that it is difficult to balance the workload between the two or more systems (A, B, . . . , N) used to process client transactions. There is no entity to oversee the processing workload of all the systems or to check the queue status of all the systems to thereby distribute the processing workload accordingly.

DISCLOSURE OF INVENTION

The present invention is directed toward a system and method for allowing messages to be processed by any of a plurality of data processing systems in a data processing environment. A shared queue is provided to store incoming messages for processing by one of the plurality of data processing systems. A common queue server receives and queues the messages onto the shared queue so that they can be retrieved by a system having available capacity to process the messages.

A system having available capacity retrieves a queued message, performs the necessary processing, and places an appropriate response message back on the shared queue.

2

Thus, the shared queue stores messages sent in either direction between clients requesting processing and the data processing systems that perform the processing. In general, the data in such messages are referred to in this patent document as "client data."

Because the messages are enqueued onto the shared queue, the messages can be processed by an application running in any of a plurality of systems having access to the shared queue. Thus, automatic workload management among the plurality of systems is provided.

Because any of the systems connected to the shared queue can process messages, an advantage of processing redundancy is provided. If a particular application that is processing a message fails, another application can retrieve that message from the shared queue and perform the processing without the client having to wait for the original application to be brought back on-line. This provides processing redundancy to clients of the data processing environment.

A unique list structure is provided to implement the shared queue. The list structure is divided into a plurality of queue types. These queue types are each divided into a plurality of list headers. A queue name assigned to each message is used to identify the queue type and the list header within that queue type at which the message is to be stored.

A private queue type is provided for access exclusively by the common queue server. A message retrieved by an application for processing, is rewritten to the private queue type when it is retrieved. This saves the message so that it can be retrieved by a second system should the first system fail. Thus, the use of a private queue type in this manner provides processing redundancy.

The foregoing and other objects, features and advantages of the invention will be apparent from the following more particular description of the preferred embodiments of the invention, as illustrated in the accompanying drawings.

BRIEF DESCRIPTION OF DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

BEST MODE FOR CARRYING OUT THE INVENTION

1. Overview and Discussion of the Invention

The present invention is directed toward a system and method for allowing any of a plurality of processing systems to process messages for one or more clients. According to the invention, a structured external storage device, such as a shared queue, is provided for queuing client messages for the plurality of systems. When incoming messages are received from the clients, they are placed on the queue. When one of the plurality of systems has available processing capacity it retrieves a message, processes the message and places a response on the queue.

Figure 1:
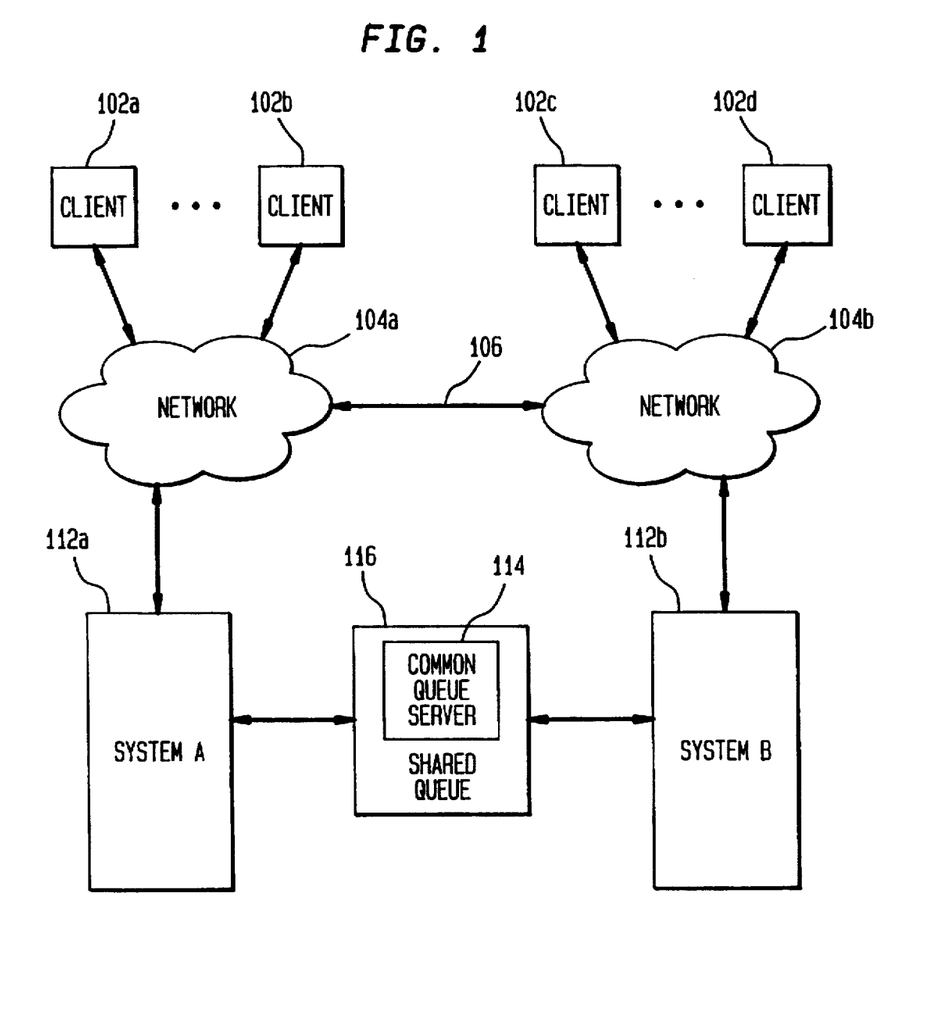
FIG. 1 is a block diagram illustrating the shared queue in a client/server environment according to one embodiment of the invention.

FIG. 1 is a block diagram illustrating the shared queue in a client/server environment according to one embodiment of the invention. The client/server environment includes one or more clients 102 interfaced to a plurality of processing systems 112 via one or more networks 104.

When a client 102 has a transaction to be processed, it sends a message to one of the systems 112 for processing. That system 112 enqueues the message onto shared queue 116. As additional messages are received from clients, they too are enqueued onto shared queue 116. Each message remains on shared queue 116 until it is retrieved by one of the systems 112 for processing.

When a system 112 determines that it has the capacity to process another transaction, that system 112 dequeues a message from shared queue 116. That system 112 then processes the message and places on shared queue 116 the appropriate response to the client that generated the incoming message.

In one embodiment, a support facility within a processor on which an application is executing receives status indications from shared queue 116 without interrupting mainline system execution.

A common queue server 114 provides the necessary interface between shared queue 116 and systems 112. When an input message is received by common queue server 114 for enqueueing onto shared queue 116, common queue server buffers the message in one or more buffers, referred to as 'CBUFFERS' and then transfers this data to the shared queue. The structure and operation of common queue server are discussed in more detail below.

The order in which incoming messages received from clients 102 are dequeued can be chosen based on implementation preferences. For example, shared queue 116 can be a FIFO so that messages are dequeued in the order in which they were received, or shared queue 116 can include a field to prioritize the messages based on a desired prioritization scheme. As will become apparent to a person skilled in the relevant art, alternative prioritization schemes can be implemented as well.

1.1 Optional Features of the Shared Queue

In one embodiment, a serialization mechanism in shared queue 116 allows more than one command to execute in parallel without a loss of data object integrity or command consistency. A forward completion mechanism sends to systems 112 an early notification of completion of certain commands without permitting results inconsistent with this notification to be obtained by systems 112. A restart mechanism permits interrupted commands to be restarted by the initiating system 112, or in certain situations, by another system 112.

2. Example Structure of the Invention

Each client 102 is preferably implemented as a client application program operating on a computer platform comprising a computer and an operating system. The computer typically includes various hardware components, such as one or more central processing units (CPU), a random access memory (RAM) and an input/output (I/O) interface, such as a LAN card.

The client application program includes instructions for performing client-related tasks. The operating system may be implemented using any well known operating system suitable for executing the client application program, such as DOS, DOS/Windows, AIX, OS/2, HP-UX, and Sun OS. The computer may be implemented using well-known hardware that supports the selected operating system. It should be understood, however, that other computers and operating systems could alternatively be used without departing from the scope and spirit of the present invention.

The common queue server 114 is preferably implemented as a queue server application program operating on a computer platform comprising a computer and an operating system. The queue server application program, when executed, enables the computer to perform the features of the interface module discussed below. The computer of common queue server 114 includes various hardware components, such as one or more central processing units (CPU), a random access memory (RAM), and an input/output (I/O) interface.

The computer of common queue server 114 is connected to a number of peripheral devices, such as one or more storage devices. The storage devices may represent floppy drive units, hard drive units, tape backup units, etc. A computer program product comprising a computer readable media having computer program logic recorded thereon, wherein the computer program logic when executed in the computer enables the computer to perform the functions of the present invention, may be read by and/or stored on the storage device. The computer program logic may then be loaded into the RAM and executed by the CPU.

Systems 112 are also preferably implemented as a computer platform comprising a computer and an operating system including the hardware components as described above, and as appropriate to execute the various application programs running thereon.

The computers of systems 112, clients 102 and common queue server 114 are connected to a communication network 104, which may be implemented as a local area network (LAN) or a wide area network (WAN), for example.

3. Example Environment

The invention can be described in terms of a straightforward example environment. The example environment is a mail order service having operators to receive telephone orders from customers. Each operator has an operator terminal for entering product orders. The operator terminals interface to transaction processing systems that check inventory, generate invoices, and initiate product shipment. In this example, the operator terminals are analogous to clients 102, and the transaction processing systems are analogous to systems 112.

The invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

4. Operation of the Invention

Figure 2:
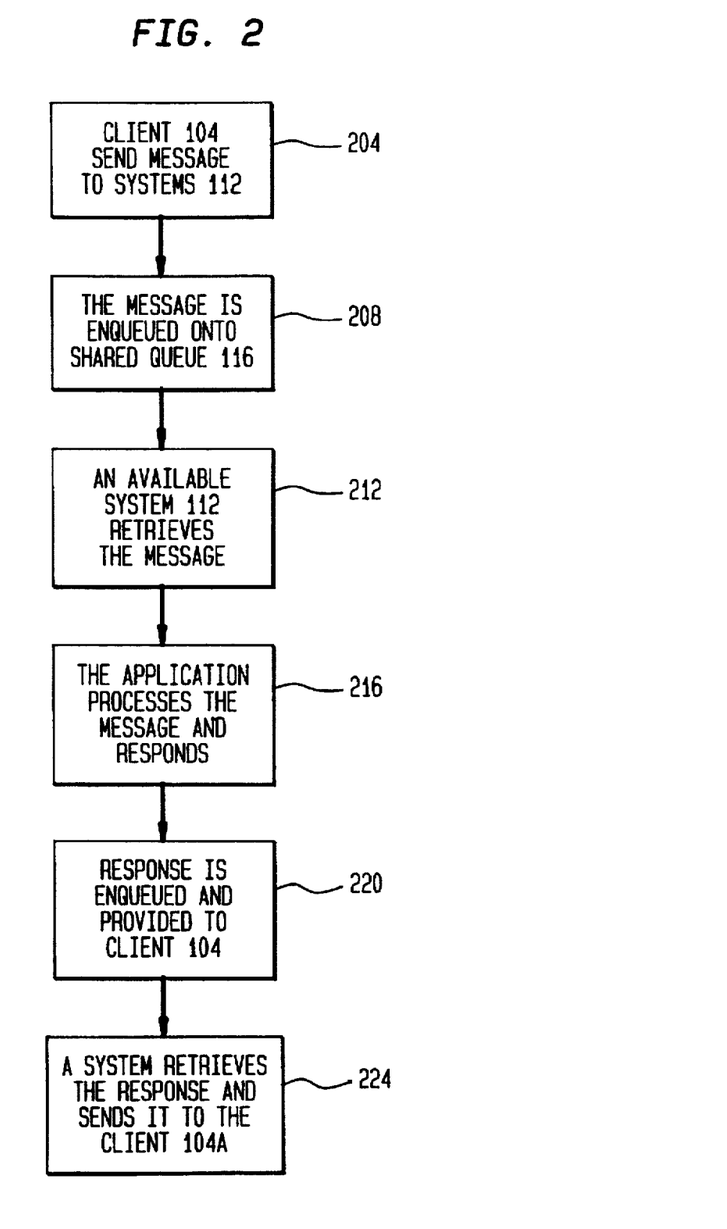
FIG. 2 is an operational flow chart illustrating the manner in which a shared queue is used to queue messages for a plurality of systems according to one embodiment of the invention.

FIG. 2 is an operational flow chart illustrating the manner in which shared queue 116 is used to queue messages to a plurality of systems 112. For simplicity, the process is described in terms of the example environment. When an operator receives an order for a product, the operator keys the product information into the operator terminal (e.g. client 102A). In a step 204, client 102A sends an order message to systems 112 indicating that an order for the product has been requested. The order message is enqueued onto shared queue 116 in a step 208. The manner in which the order message is enqueued according to one embodiment is described in detail below with reference to FIGS. 5–8.

In a step 212, an application running on an available system 112 (e.g. system 112A) retrieves the enqueued order message. Note that any available system 112 having the appropriate application program and the capacity to process the message can retrieve the message from shared queue 116. Thus processing of the message is not limited to processing on any one system 112.

In a step 216, the application that retrieved the message performs the appropriate processing on the message. In the case of the product-order example, the application makes the appropriate database calls to determine whether the requested product is currently in inventory. A response message is generated indicating whether the product is in inventory. In a step 220 the response message is enqueued in shared queue 116. In a step 224, a system 112 retrieves the response and sends the response to operator terminal (client 102A) to indicate to the operator the inventory status of the product. In one embodiment, common queue server 114 informs one of the systems 112 that a response is available. The notified system 112 retrieves the response and sends it to the client 104A.

If the product is currently in inventory as determined by the application, the operator informs the customer that the product is in stock and available for immediate delivery. If the customer still wants the product, the operator enters the order into the terminal. As a result of this action, a second order message is created and enqueued onto shared queue. Second order message indicates a firm order for the product.

The operation now continues back at steps 212 and 216 where an application running on an available system 112 retrieves the enqueued order message and performs the appropriate processing on the message. In this case, the application reads the second order message indicating the products ordered, the customer delivery information, and payment information. The application validates the payment method, generates an invoice for product shipment and informs the warehouse to prepare the shipment. If further communications with the operator are required based on these actions, a response is enqueued onto shared queue 116 for transmittal to the operator.

5. Queue Structure

Figure 3:
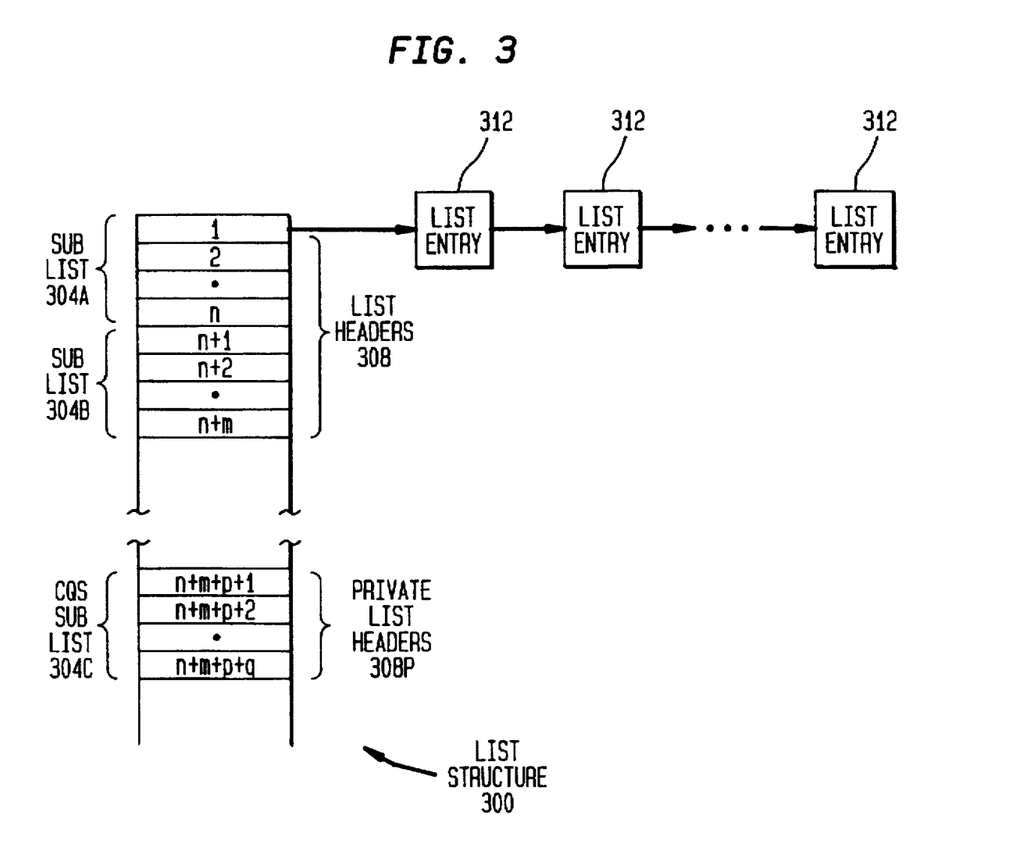
FIG. 3 is a diagram illustrating a list structure 300 used to implement a shared queue according to one embodiment of the invention.

Critical to the operation of a shared queue as described above, is proper selection of a queue structure. The preferred queue structure is now described. It will become apparent to a person skilled in the relevant art how alternative queue structures could be implemented. FIG. 3 is a diagram illustrating a list structure 300 used to implement shared queue 116 according to one embodiment of the invention. In this embodiment, a single list structure 300 is implemented as the queue structure. Clients 102 and systems 112 that wish to share this list structure 300 do so via common queue server 114.

List structure 300 is comprised of several sub lists, referred to as queue types 304. Each queue type 304 is comprised of a plurality of list headers 308. Zero or more messages, or list entries are chained off of list headers 308 as illustrated by list entries 312.

The feature of dividing list structure 300 into several sub lists, or queue types 304, allows multiple 'separate' queues to be implemented. Thus, for example, queue type 304A can be used as an input queue for storing input messages and queue type 304B can be used as an output queue for storing output messages. This allows input and output operations to occur simultaneously without interfering with one another.

As stated above, each queue type 304 is divided into a plurality of list headers 308. This is done to eliminate, or at least minimize, contention for shared queue 116. If, on the other hand, all applications put their messages on the same list header 308, there would be contention because only one request can be serviced at any one time (i.e., the operations are atomic). Multiple list headers 308 allow multiple applications (running on both systems 112 and clients 102) to enqueue and dequeue messages from list structure 300 simultaneously.

Common queue server 114 specifies the number of list headers 308 that the list structure 300 contains, and groups these list headers 308 into queue types 304. When an application provides a message to common queue server 114 for enqueuing onto shared queue 116, the message is assigned a queue name by system 112. The first byte of the queue name indicates the queue type 304 to which the message belongs. A hashing algorithm is used to determine which list header 308 is to be used within the identified queue type 304.

One or more queue types 304 are reserved for the private use of the common queue servers 114. One example of such a sublist, referred to as a 'private queue,' is illustrated as sublist 304C in FIG. 3. The private queues are used exclusively by the common queue servers 114 and applications are not able to place data directly on them.

One use for a private queue is to 'lock' a message being processed by an application. When an application dequeues a message for processing, the message (i.e., list entry 312) is removed from its associated queue type 304 and placed in the private queue 304C. This is done for two reasons. First, as long as the list entry 312 is in the private queue no other application will access it for processing. Thus, each message is only processed by one application. Second, if the processing application, or the system 112 on which the processing application is running, fails, the list entry 312 is not lost. In the event that such a failure should occur, the list entry is returned to its original list header 308 so that it can be processed by an application running in another system 112.

In an alternative embodiment, a lock field is provided with each list entry 312. When an application in a system 112 retrieves data from a list entry 312, the field is set as locked. When locked, no other application can retrieve the message.

6. List Entry Structure

Figure 4A:
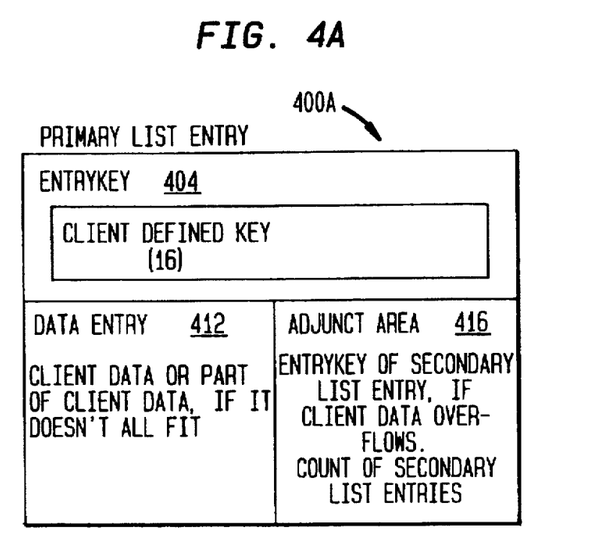
FIG. 4A illustrates a representative structure for a list entry according to one embodiment of the invention.
Figure 4B:
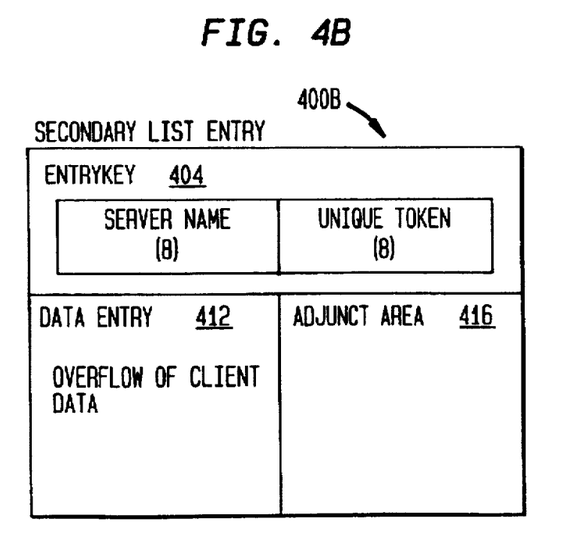
FIG. 4B illustrates a secondary list entry 400B used for overflow data from a primary list entry 400A according to one embodiment of the invention.

A representative structure for a list entry 312 according to one embodiment of the invention is illustrated in FIG. 4A. Specifically, FIG. 4A illustrates a primary list entry 400A. FIG. 4B illustrates a secondary list entry 400B used for overflow data from a primary list entry 400A. Each list entry 312 (400A, 400B) is comprised of an entry key 404, an adjunct area 416, and a data entry area 412.

The entry key is used to access entries 312 in list structure 300. The list entry 312 created for a client data object is referred to as a 'primary list entry' 400A and uses the queue name defined by system 112 as the entry key. An entry identifier can also be included to be used internally by common queue server 114. The entry identifier is not known to the client.

The adjunct area 416 for the primary list entry 400A is used by common queue server 114 to manage the spanning of client data objects across secondary list entries 400B and to associate multiple list entries that belong to the same unit of work. Adjunct area 416, which is not accessible to the clients 102, is comprised of an entry key 404 of the secondary list entry 400B where overflow data are stored, and a count of the number of secondary list entries 400B used to store overflow data for that list entry 400. In one embodiment, all secondary list entries for a data object share the same key.

The data entry area 412 is used for storing application data objects. Primary list entry 400A stores all the message data if they fit. If the data do not fit in one entry, overflow data are stored in one or more secondary list entries 400B. Common queue servers 114 are not concerned with the actual contents of data entry area 412.

7. Enqueuing Data

When an application in a system 112 wishes to enqueue data onto shared queue 116, it passes the data to a common queue server 114. The system 112 assigns an entry key to the data. As described above, the entry key is used to indicate the sublist 304 and list header 308 where the data are to be stored. In one embodiment, the entry key is 16 bytes long, although the key is scalable.

Figure 5:
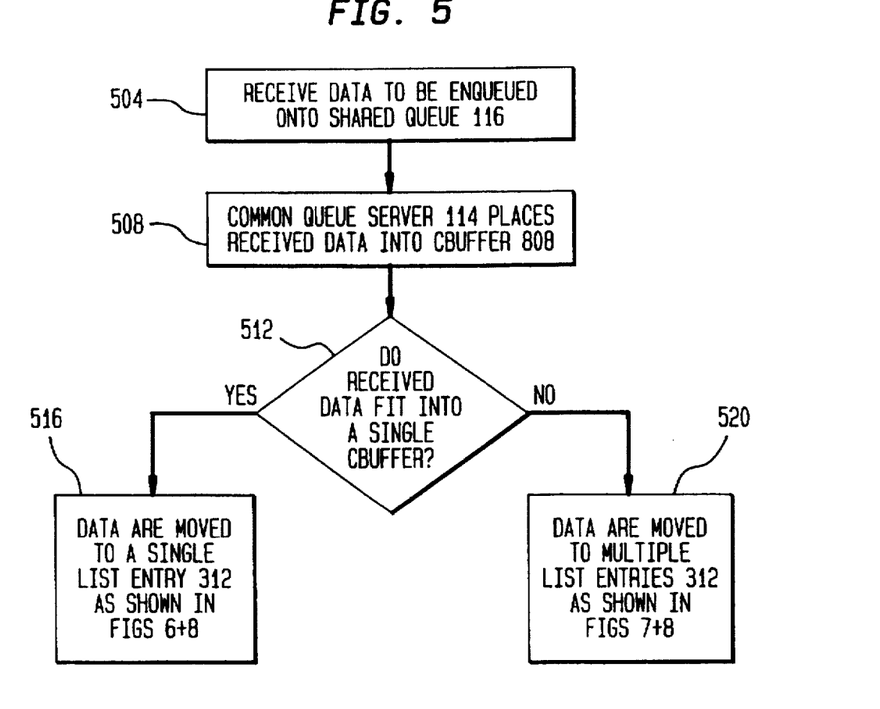
FIG. 5 is an operational flow diagram illustrating the process that occurs when a common queue server receives data from an application according to one embodiment of the invention.

FIG. 5 is an operational flow diagram illustrating the process that occurs when a common queue server 114 receives data from an application according to one embodiment of the invention. In a step 504, common queue server 114 receives data from an application. In a step 508, common queue server 114 places the data into its own buffers, known as CBUFFERs. The size of a CBUFFER is the maximum list entry size.

If the application's data do not fit into one CBUFFER, common queue server 114 spans the data across multiple CBUFFERs. The multiple CBUFFERS used for a single entry are referred to as a single virtual CBUFFER 808 (illustrated in FIG. 8). Therefore, in a decision step 512, it is determined whether the received data will fit into a single CBUFFER. If the data do fit into a single CBUFFER, the operation continues at a step 516 where a single request is used to move the data from the CBUFFER to the list structure 300 (i.e. only a primary list entry is used for this request). If the user's data do not fit into one CBUFFER, the operation continues at a step 520 where the data are spanned across multiple CBUFFERs before being enqueued onto shared queue 116.

Figure 6:
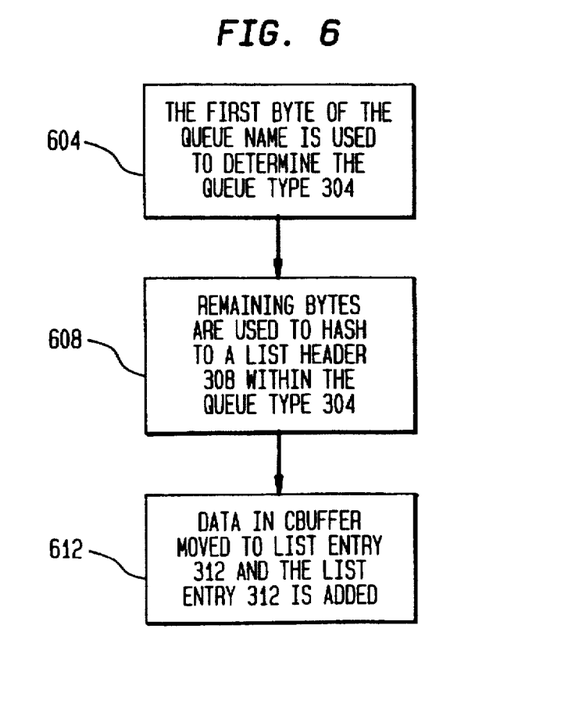
FIG. 6 is a flow chart illustrating the enqueuing of data where all data fit into a single CBUFFER according to one embodiment of the invention.

FIG. 6 is a flow chart illustrating the enqueuing of data where all data fit into a single CBUFFER. Referring now to FIG. 6, once all the application's data are moved into a CBUFFER, the queue name passed by the application is used to decide where to place the data. In this regard, in a step 604, the first byte of the queue name is used to determine the queue type (i.e., the sublist 304). In a step 608, the remaining bytes of the queue name (15 in the preferred embodiment) are hashed to determine the list header 308 within the sublist 304.

In a step 612, a writer request moves the data in the CBUFFER to the data entry 412 of a list entry 312 and adds the list entry 312 to the determined list in ascending order of entry key. If a list entry 312 is added to a list that already has list entries 312 with the same key value, the new list entry 312 is added to the front or back of the existing entries 312 depending on what the system 112 requested.

Figure 7:
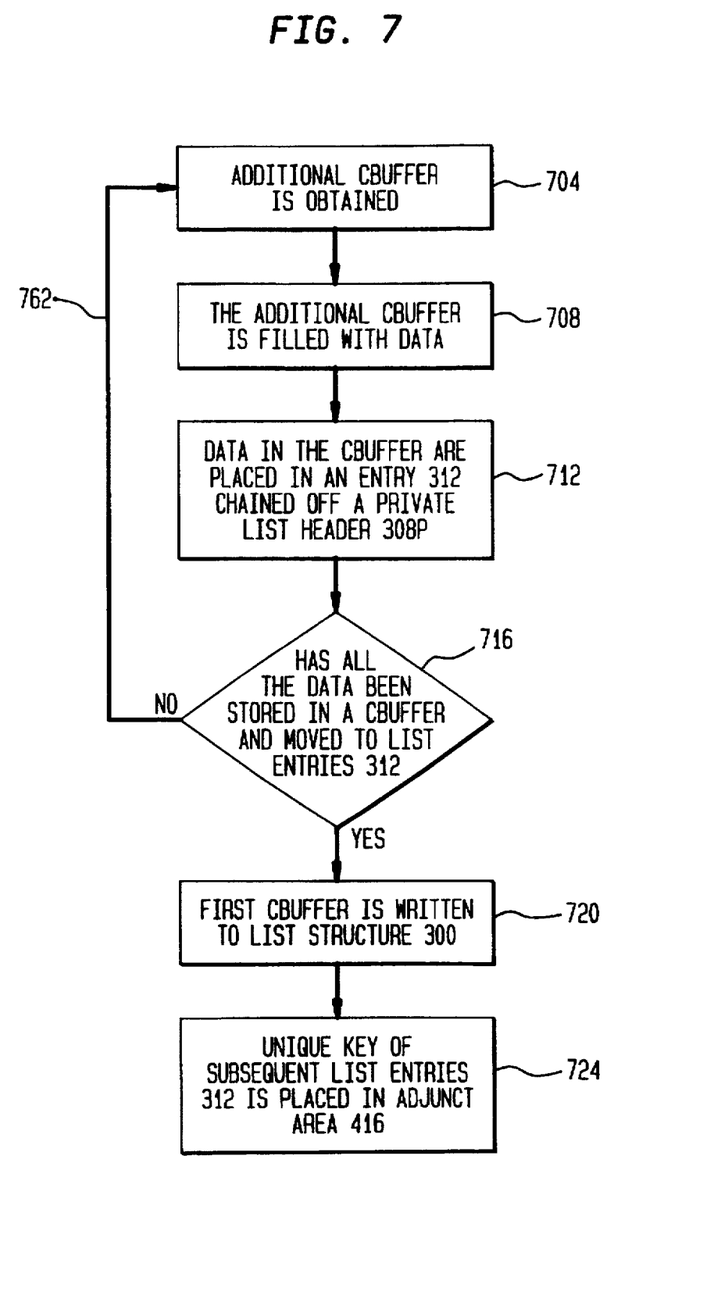
FIG. 7 is a flow chart illustrating the enqueuing of data where multiple CBUFFERS are required according to one embodiment of the invention.

FIG. 7 is a flow chart illustrating the enqueuing of data where multiple CBUFFERS are required. In a step 704, if upon filling the first CBUFFER, the server realizes there are still more data to move, another CBUFFER is obtained. The first CBUFFER is not written to Shared Queue 116 at this time. It is kept in storage until all subsequent CBUFFERs have been written out to Shared Queue 116. As soon as the first CBUFFER (primary list entry) is placed on a list header, the data are available to others.

In a step 708, once the second CBUFFER is filled, a key is generated that is unique across the data processing environment. In a step 712 the server issues a write request to place the data in the list structure 300. The write request is used to move the data to a list entry 312 and to place the list entry 312 on one of the private list headers 308P using the new key value.

Once the second CBUFFER is written, the next CBUFFER is filled and placed on one of the private list headers using the same unique key value generated for the second CBUFFER. This process is repeated until all the data has been moved to CBUFFERs and placed on one of the private list headers. This is illustrated by decision block 716 and flow line 762.

Once all of the second and subsequent CBUFFERS are written to list structure 300, the first CBUFFER filled is written. This occurs in a step 720. Thus, the first CBUFFER filled is the last CBUFFER written to the list structure 300. This CBUFFER becomes the primary list entry for the client request. To tie the list entries together, in a step 724, the unique key of the subsequent list entries is placed in the adjunct area 416 of the list entry containing the first CBUFFER of data.

The key used when writing the first CBUFFER to Shared Queue 116 is the queue name passed by the client. The first byte of the queue name is used to determine the section of list headers. The next fifteen bytes of the queue name are hashed to determine the list header within the section. The write request moves the data in the CBUFFER to the data entry of a list entry and adds the lists entry to the determined list.

Figure 8:
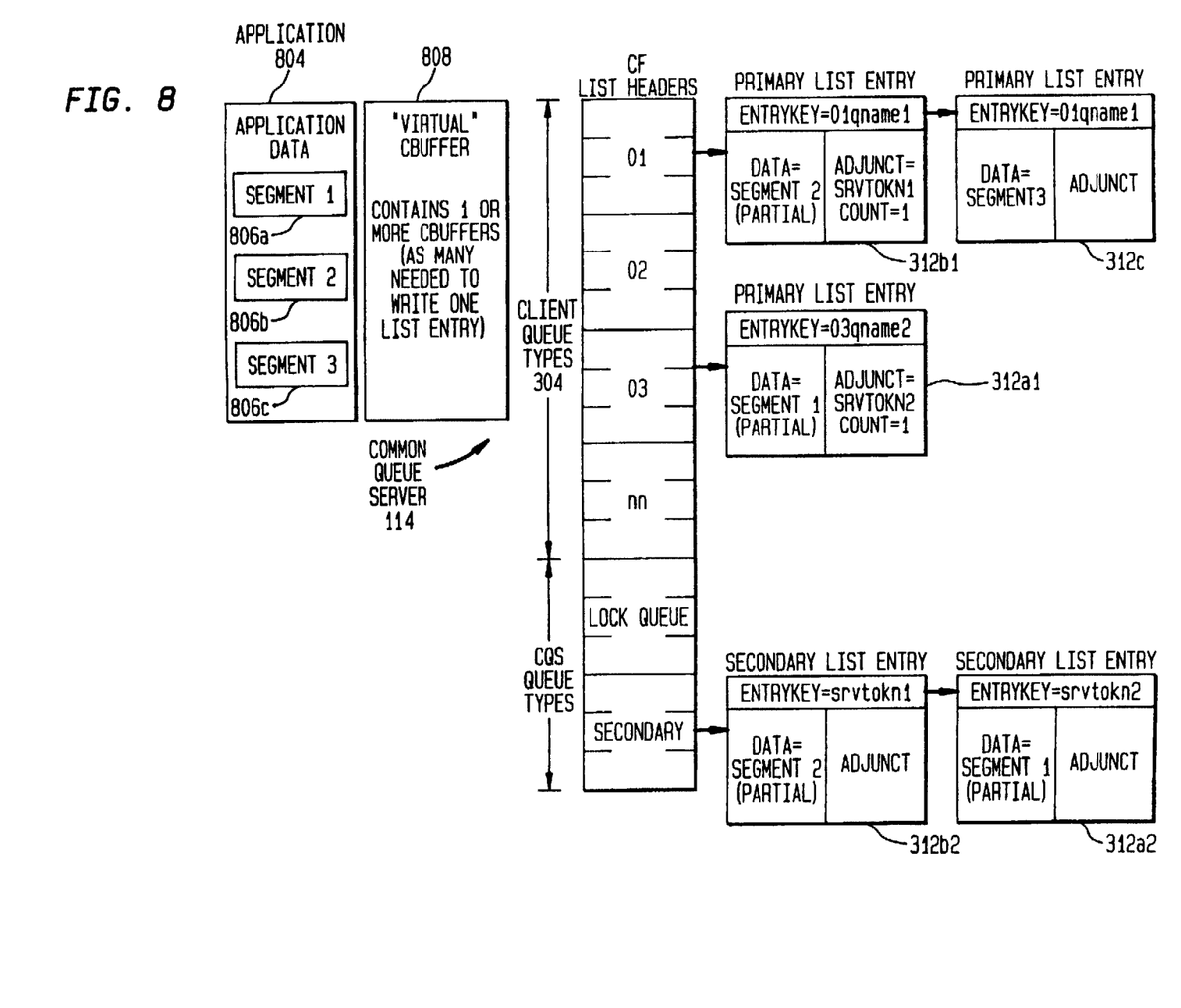
FIG. 8 is a diagram illustrating one example of the utilization of the list structure.

FIG. 8 is a diagram illustrating one example of the utilization of the list structure 300. In this example, the application data 804 are comprised of 3 message segments, called segments 806A, 806B and 806C. These segments 806 result in 5 list entries being placed on the shared queue 116. The list structure 300 is divided into 1 through n queue types 304 for the client, and two private queues 304 for the server (a locked queue and a queue for the secondary list entries).

In this example, the application data 806 are in 3 segments and require 3 calls to the common queue server 114. In this example, the first two segments 806A and 806B exceed the maximum data entry size of a list entry, so secondary list entries are created by the server to contain the client data overflow. For segment 806A, primary list entry 312A1 and secondary list entry 312A2 are created. Note that adjunct area 416 of primary list entry 312A1 points to secondary list entry 312A2. Similarly, for segment 806B, primary list entry 312B1 and secondary list entry 312B2 are created. Adjunct area 416 of primary list entry 312B1 points to secondary list entry 312B2. For segment 806C, only one list entry, primary list entry 312C, is created.

FIG. 8 also illustrates a 'virtual' CBUFFER 808 in a common queue server 114. A virtual CBUFFER is comprised of one or more actual CBUFFERS, as needed, to store the received message data. Although only one virtual CBUFFER 808 is illustrated, preferably, there is a virtual CBUFFER 808 for each segment 806 received.

8. Conclusion

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A system for allowing one or more processing systems to process client requests, comprising:

a first data processing system, said first data processing system having a first data processing application program running thereon, wherein said application program is configured to submit a message for processing;

a plurality of second data processing systems, at least one of said plurality of second data processing systems is configured to receive said message and transmit said message for storage on a queue, at least one of said plurality of second data processing systems configured to retrieve said message from said queue, process said message via one or more data processing programs running thereon, and transmit a second message to said queue;

a queue processor and shared storage device, said queue processor and shared storage device configured to provide communications between said plurality of second data processing systems, and to store said message in said queue in the form of a list entry, said queue comprising:

a plurality of queue types having one or more list headers, wherein said message is stored within said list entry associated with a list header associated with one of said queue types based on the type of said message, wherein each of said one or more list headers is accessible at any given time by only one of said second data processing systems, such that said one or more list headers minimize contention for access to messages located therein.

2. The system of claim 1, wherein said queue processor and shared storage device further comprises:

a list entry storage device, wherein said list entry storage device assigns an entry key to identify said list entry and stores said message in a data field thereof.

3. The system of claim 2, wherein said list entry storage device chains said list entry from one of said list headers if there are no other list entries chained from said one of said list headers, and wherein said list entry storage device chains said list entry from a list entry having been last added to said one of said list headers if there are other list entries chained from said one of said list headers.

4. The system of claim 2, wherein said list entry storage device creates a second list entry and places therein a remainder of said message if said message is larger than said data field of said list entry.

5. The system of claim 4, wherein said list entry storage device chains said second list entry from a queue type pertaining to secondary list entries.

6. The system of claim 4, wherein said list entry further comprises an adjunct area for identifying said second list entry.

7. The system of claim 4, wherein said second list entry is chained from a secondary queue type list header if there are no other second list entries chained from said secondary queue type list header, and wherein said second list entry is chained from a second list entry having been last added to said secondary queue type list header if there are other second list entries chained from said secondary queue type list header.

8. The system of claim 1, wherein said first data processing system is a client computer system with a processor and a RAM.

9. The system of claim 1, wherein said plurality of second data processing systems are computer platforms each comprising a processor and a RAM.

10. The system of claim 1, wherein said list entry comprises:

an entry key for identifying said list entry, wherein said entry key is based on a queue type assigned to said message; and a data field for storing message data associated with said message.

11. The system of claim 1, further comprising a private queue type for locking said message if said message is being processed by one of said plurality of second data processing systems.

12. The system of claim 1, wherein said message is stored in a plurality of buffers before storage thereof on said queue.

13. A system for allowing one or more processing systems to process client requests, comprising:

a first data processing means having a first data processing application program running thereon, wherein said application program is configured to submit a message for processing;

a plurality of second data processing means, at least one of said plurality of second data processing means is configured to receive said message and transmit said message for storage on a queue means, at least one of said plurality of second data processing means configured to retrieve said message from said queue means, process said message via one or more data processing programs running thereon, and transmit a second message to said queue means;

a queue processor and shared storage means configured to provide communications, between said plurality of second data processing means, and to store said message in said queue means in the form of a list entry, said queue means comprising:

a plurality of queue type means having one or more list header means, wherein said message is stored within said list entry associated with a list header means, associated with one of said queue type means based on the type of said message, wherein each of said one or more list header means is accessible at any given time by only one of said second data processing means, such that said one or more list header means minimize contention for access to messages located therein.

14. The system of claim 13, wherein said queue processor and shared storage means further comprises:

a list entry storage means for assigning an entry key to identify said list entry and storing said message in a data field thereof.

15. The system of claim 14, wherein said list entry storage means chains said list entry from one of said list header means if there are no other list entries chained from said one of said list header means, and wherein said list entry storage means chains said list entry from a list entry having been last added to said one of said list header means if there are other list entries chained from said one of said list header means.

16. The system of claim 14, wherein said list entry storage means creates a second list entry and places therein a remainder of said message, if said message is larger than said data field of said list entry.

17. The system of claim 16, wherein said list entry storage means chains said second list entry from a queue type means pertaining to secondary list entries.

18. The system of claim 16, wherein said list entry further comprises an adjunct area for identifying said second list entry.

19. The system of claim 16, wherein said second list entry is chained from a secondary queue type means list header if there are no other second list entries chained from said secondary queue type means list header, and wherein said second list entry is chained from a second list entry having been last added to said secondary queue type means list header if there are other second list entries chained from said secondary queue type means list header.

20. The system of claim 13, wherein said first data processing means is a client computer system with a processor and a RAM.

21. The system of claim 13, wherein said plurality of second data processing means are computer platforms each comprising a processor and a RAM.

22. The system of claim 13, wherein said list entry comprises:

an entry key for identifying said list entry, wherein said entry key is based on a queue type assigned to said message; and a data field for storing message data associated with said message.

23. The system of claim 13, further comprising a private queue type for locking said message if said message is being processed by one of said plurality of second data processing systems.

24. The system of claim 13, wherein said message is stored in a plurality of buffers before storage thereof on said queue.

* * * * *